United States Patent
Waddington et al.

(10) Patent No.: US 9,305,281 B2
(45) Date of Patent: Apr. 5, 2016

(54) METHOD AND SYSTEM FOR ORDER FULFILLMENT IN A DISTRIBUTION CENTER

(71) Applicant: June Ray Limited, Road Town (VG)

(72) Inventors: William Henry Waddington, Foster City, CA (US); Patricia C. Grewell, San Mateo, CA (US); Peter Ham, Mountain View, CA (US); Boris Klots, Belmont, CA (US)

(73) Assignee: June Ray Limited (VG)

( * ) Notice: Subject to any disclaimer, the term of this patent is extended or adjusted under 35 U.S.C. 154(b) by 0 days.

(21) Appl. No.: 14/866,285

(22) Filed: Sep. 25, 2015

(65) Prior Publication Data

US 2016/0019633 A1 Jan. 21, 2016

Related U.S. Application Data

(63) Continuation of application No. 14/137,974, filed on Dec. 20, 2013, which is a continuation of application No. 13/418,527, filed on Mar. 13, 2012, now Pat. No. 8,626,333, which is a continuation of application No. 12/387,801, filed on May 6, 2009, now Pat. No. 8,140,183, which is a continuation of application No. 11/356,870, filed on Feb. 18, 2006, now Pat. No. 7,532,947, which is a continuation of application No. 09/568,571, filed on May 10, 2000, now Pat. No. 7,139,637.

(60) Provisional application No. 60/133,646, filed on May 11, 1999.

(51) Int. Cl.
G06F 7/00 (2006.01)
G06Q 10/08 (2012.01)
G06F 17/30 (2006.01)

(52) U.S. Cl.
CPC .... G06Q 10/08355 (2013.01); G06F 17/30902 (2013.01)

(58) Field of Classification Search
CPC ................................................ G06Q 10/08355
USPC ......................................................... 700/216
See application file for complete search history.

(56) References Cited

U.S. PATENT DOCUMENTS

| | | | | |
|---|---|---|---|---|
| 5,395,206 A | * | 3/1995 | Cerny, Jr. ............. | B65G 1/1378 414/270 |
| 5,434,394 A | * | 7/1995 | Roach ..................... | A47F 9/046 235/375 |
| 5,834,753 A | * | 11/1998 | Danielson ........... | B60R 16/0231 235/472.01 |
| 6,061,607 A | * | 5/2000 | Bradley ................ | B65G 1/1376 414/273 |
| 6,185,479 B1 | * | 2/2001 | Cirrone .................. | G06Q 10/08 700/213 |
| 7,346,564 B1 | * | 3/2008 | Kirklin ................ | G06Q 10/087 705/26.1 |

* cited by examiner

*Primary Examiner* — Kyle Logan
(74) *Attorney, Agent, or Firm* — Van Pelt, Yi & James LLP

(57) ABSTRACT

Order allocation techniques pertaining to stops that a container makes in the process of fulfilling a customer order is disclosed. In one embodiment, this is accomplished by first identifying a pod that stocks the largest number of different items in a customer order. Then, a second pod is identified that stocks the largest number of remaining items in the customer order. The collection of pods defines a container path through the distribution center.

20 Claims, 6 Drawing Sheets

METHOD AND SYSTEM FOR ORDER FULFILLMENT IN A DISTRIBUTION CENTER

CROSS REFERENCE TO OTHER APPLICATIONS

This application is a continuation of co-pending U.S. patent application Ser. No. 14/137,974, entitled METHOD AND SYSTEM FOR ORDER FULFILLMENT IN A DISTRIBUTION CENTER filed Dec. 20, 2013 which is incorporated herein by reference for all purposes, which is a continuation of U.S. patent application Ser. No. 13/418,527, now U.S. Pat. No. 8,626,333, entitled METHOD AND SYSTEM FOR ORDER FULFILLMENT IN A DISTRIBUTION CENTER filed Mar. 13, 2012 which is incorporated herein by reference for all purposes, which is a continuation of U.S. patent application Ser. No. 12/387,801, now U.S. Pat. No. 8,140,183, entitled METHOD AND SYSTEM FOR ORDER FULFILLMENT IN A DISTRIBUTION CENTER filed May 6, 2009 which is incorporated herein by reference for all purposes, which is a continuation of U.S. patent application Ser. No. 11/356,870, now U.S. Pat. No. 7,532,947, entitled METHOD AND SYSTEM FOR ORDER FULFILLMENT IN A DISTRIBUTION CENTER filed Feb. 18, 2006 which is incorporated herein by reference for all purposes, which is a continuation of U.S. patent application Ser. No. 09/568,571, now U.S. Pat. No. 7,139,637, entitled ORDER ALLOCATION TO MINIMIZE CONTAINER STOPS IN A DISTRIBUTION CENTER filed May 10, 2000 which is incorporated herein by reference for all purposes.

U.S. patent application Ser. No. 09/568,571, now U.S. Pat. No. 7,139,637, entitled ORDER ALLOCATION TO MINIMIZE CONTAINER STOPS IN A DISTRIBUTION CENTER filed May 10, 2000 claims priority to U.S. Provisional Application No. 60/133,646, entitled ELECTRONIC COMMERCE ENABLED DELIVERY SYSTEM AND METHOD filed May 11, 1999 which is incorporated herein by reference for all purposes.

BACKGROUND OF THE INVENTION

This invention pertains to fulfilling customer orders from inventory stocked within a distribution center. More specifically, this invention pertains to fulfilling an order by choosing specific pods for container stops in the distribution center.

Distribution centers are buildings or regions where inventory is stored and used to fulfill orders for customers. Customers place orders by various modes such as by telephone, mail, Internet browsers, and the like. To run a distribution center economically it should be run with a high "throughput."

A distribution center's throughput is defined as the volume of inventory or number of orders fulfilled in a given unit of time. The enterprise running the distribution center attempts to fulfill as many orders as possible in the shortest amount of time. At least two parameters feature prominently in maximizing throughput: (a) useable inventory and (b) load balancing during order fulfillment. Usable inventory simply refers to the amount of inventory that is immediately available for order fulfillment. Obviously, if a distribution center has insufficient inventory to immediately fulfill all its orders, that distribution center cannot realize its potentially highest throughput. Load balancing refers to consistently using all order fulfillment mechanisms available for fulfilling orders. If any of these mechanisms sit idle, throughput drops off rapidly.

A given distribution center may have many order fulfillment mechanisms. In one example, the distribution center includes a conveyor that transports a container to various locations, each of which has an order fulfillment mechanism. One location may have a bank of carousels, each containing numerous bins of inventory. Each bin holds one or more types of inventory. When a container arrives at a carousel, it rotates its inventory into a position where order items can be placed in the container. Another order fulfillment mechanism in the distribution center may have a few aisles each containing multiple bins. A worker moves through the aisles to pick out requested items and place them in the container. Other types of order fulfillment mechanisms may be employed. A "pod" is a group of inventory locations all serviced from the same stop on the transport system (e.g., a conveyor stop). A pod may contain any or more of the various types of order fulfillment mechanism. Each pod has one or more types of inventory available for "picking." Picking refers to the operation of retrieving an item of inventory from a pod and placing it into a container. The container holds the various items that fulfill a given order.

Given that different customers have very different needs and preferences, different orders provide wide and rather unpredictable variation. Optimal load balancing to meet this variation presents a serious challenge. During a given week, for example, several grocery orders may require milk, but only a few of these require anchovies, a few others require spicy tofu, and still a few others require cotton swabs. In fulfilling these various orders, any one of these items could present a throughput bottleneck. Controlling the position and path of a container used to fulfill an order can at least partially address this problem.

The present invention fills a need for better ways to fulfill customer orders within a distribution center.

SUMMARY OF THE INVENTION

This invention provides a method and associated warehouse management system pertaining to stops that a container makes in the process of fulfilling a customer order. According to one embodiment, this is accomplished by first identifying a pod that stocks the largest number of different items in a customer order. Then, a second pod is identified that stocks the largest number of remaining items in the customer order. The collection of pods defines a container path through the distribution center.

One aspect of this invention provides a method of filling a customer order in a distribution center having a plurality of pods. Each such pod has multiple inventory locations for storing a plurality of items. The method may be characterized by the following sequence: (a) identifying items and quantities of these items contained in the customer order; (b) identifying a first pod having the most items from the customer order; (c) allocating the order items found in the first pod to the first pod; (d) considering remaining order items not allocated to the first pod, identifying a second pod having the most remaining order items; and (e) allocating the remaining order items found in the second pod to the second pod. The process may continue to identify additional pods as necessary to allocate the remaining items in the order. Allocating the order items typically requires designating specific inventory from specific locations in the first pod as belonging to the customer order. It is, of course, possible that all items from a particular order will be contained in the first pod. When this is the case, there is no need to locate a second pod.

Part of the allocation process may generate picking tasks to move the specific inventory from its specific locations to a container for the order. The customer order is fulfilled by stopping a container at at least the first and second pods and picking allocated items at these pods and placing them into the container.

Another aspect of the invention pertains to a distribution center having inventory arranged for filling customer order. The distribution center may be characterized by the following features: (a) at least one ambient having a plurality of pods; and (b) a warehouse management system for identifying a first pod and a second pod and allocating customer order items to the first and second pods. The first pod will be the pod within the distribution center (or an ambient within the distribution center) stocking the most items from the customer order. The second pod will be the pod that stocks the most remaining items from the customer order after other items have been allocated to the first pod. In addition to the pods and the warehouse management system, the distribution center typically will have a transport system such as a conveyor that moves a container from pod to pod in order till orders.

The distribution center may further include an automated material handling system that receives instructions from the warehouse management system for fulfilling the customer orders. Specifically, the automated material handling system controls picking of inventory items from specific inventory locations to fulfill the customer order.

Often the distribution center will have a plurality of ambiences, each with its own collection of pods. In such cases, the customer order may be divided into at least a first group of items stocked in a first ambient and a second group of items stocked in a second ambient. The above method may then be performed on the first group of items in the first ambient and separately performed on the second group of items in the second ambient. The distribution center may have separate transportation systems and containers for each ambient. Examples of ambients include refrigerators, freezers, room temperature ambients, humidors, and wine cellars.

Another aspect of the invention pertains to warehouse management systems that may be used as described above. The warehouse management system may be characterized by the following features: (a) a database of inventory within the distribution center; and (b) logic for identifying a first pod and a second pod and allocating customer order items to the first and second pods. Allocating items to the pods may be performed in accordance with an algorithm as outlined in the above discussion of a method of this invention. The database specifies inventory locations where each of the items are stocked. Upon allocating the customer order items the warehouse management system may update the database of inventory.

The inputs to the warehouse management system could include customer orders that may specify at least a product ID and a quantity for each item of the customer order. The outputs to the warehouse management system include picking tasks specifying at least an inventory location and a quantity to pick for the items from the customer orders. The picking task may also specify a specific container into which items from the customer order are to be placed.

These and other features and advantages of the present invention will be described in more detail below with reference to the associated figures.

DETAILED DESCRIPTION OF THE PREFERRED EMBODIMENTS

Figure 1:
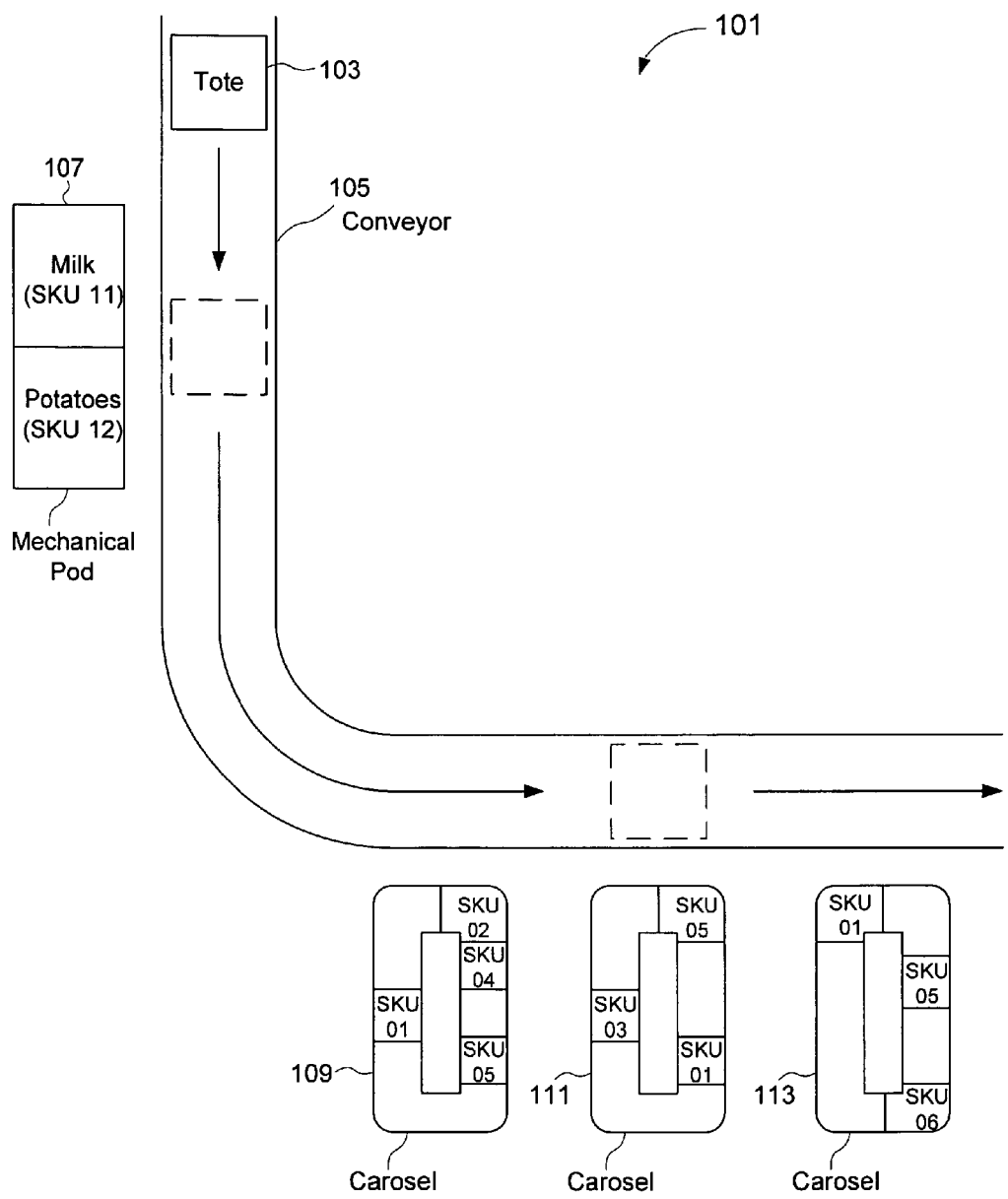
FIG. 1 is a block diagram of a distribution center in which inventory is placed based upon how rapidly it is consumed.

The following discussion presents some terms and concepts pertinent to the operation of a distribution center. The invention is not specifically limited to the examples described hereafter.

Totes are storage containers used to hold products for transportation to the consumer. There may be several different sizes of totes. Additionally, some totes may be designed for holding frozen and refrigerated goods. In some embodiments, the totes are relatively sturdy and have closable lids.

Each tote may have an identifier to support automated movement through the distribution center by conveyor. For example, each tote can have a bar code identifier that can be scanned as it moves past various points in the system. In this manner, a tote can be moved from a tote induction area to a specific pod or other location with the system tracking the location of the tote.

As indicated, the distribution center has a transport system such as a conveyor that moves totes and trays to pods and other locations within distribution center. "Trays" are used to transport new inventory from a receiving station in the distribution center to individual pods within the distribution center. Identifiers on the trays allow them to be automatically routed to specific destinations within the distribution center. In a specific embodiment, conveyors from Buschmann Company, Cincinnati, Ohio, are used. In another specific embodiment, software from SeayCo Integrators, Conyers, Ga. automates conveyor movement.

Generally, a pod is a collection of storage areas (inventory locations or bins) within a distribution center. As mentioned, a single distribution center may have several types of pods. Each of the different pods and pod types may be adapted for different temperatures, e.g., frozen goods mechanized pod. The different pods and pod types may also be adapted for the rate of product movement, e.g., mechanized pods for fast moving items.

Carousel pods include one or more carousels adjacent to one or more conveyors. In one embodiment, each pod has three carousels adjacent to two conveyors for incoming trays and totes. In some embodiments, two additional conveyors are provided: an express conveyor and an empty conveyor. The express conveyor is used to transport totes directly from the carousel pod to the outbound distribution point for totes. The empty conveyor is used to transport empty trays back to the receiving area to receive new incoming products.

Generally, a carousel is a rotating high capacity storage area. Due to the rotating design of the carousels, only items stored in a small section of the carousel can be easily accessed at a given time. This trade-off allows the carousels to store large numbers of items at the expense of rapid access. One suitable carousel for use with this invention is available from Diamond Phoenix, Lewiston, Me.

Mechanized pods, or mechanical pods, are areas designed to hold the faster moving, and also bulkier and heavier, products for easy access. Each mechanized pod may have inbound and outbound conveyors. Received products may be placed directly into the mechanical pod for storing. Because the mechanical pod items may also be bulkier and heavier than other products, totes that include mechanical pod items may be sent to the mechanical pod prior to the other pods.

Manual pods are areas where "fill to order" items such as produce, bulk foods, pharmacy prescriptions, and/or prepared meals may be prepared and/or stored. The products in the manual pods are typically placed in totes last. Products in manual pods are customer specific preparations. Items are brought from fill to order preparation areas to the manual pods for placement (pick tasks) into totes.

A "pick task" is the retrieval of a product, or multiple quantities of the same product, to fill an order. Thus, an order for ten different products would be comprised of ten pick tasks. However, if the order included five bags of Brand X potato chips, that might be consolidated into a single pick task—depending on the number of bags of potato chips in the pod. For example, if pod two had only two bags of potato chips left and pod three had the last three bags of potato chips, two pick tasks would be required.

Carousel pick tasks may require the coordination of the conveyors to transport the tote to the appropriate pod with the carousels to bring the appropriate storage tray to an accessible position. The pick task may be scheduled, or generated, prior to the actual physical movement of the product, or products, from a carousel location to a tote. Once the pick task is accomplished, the conveyor may move the tote to the next destination automatically. In some embodiments, a push button signal is employed to allow the pick operator to signal that she/he has placed the product, or products, into the tote. Mechanized pick tasks can be accomplished by using carts to move totes received on the inbound conveyor to the products. The products can then be put into the totes for delivery. Once the necessary items are in the totes, the tote is placed on the outbound conveyors. The process for manual pick tasks may be similar to the mechanized pick task. The tote that arrives on the inbound conveyor is scanned. A list of locations with items for the tote is displayed. An operator retrieves the indicated items from the listed locations and then transfers the tote on the outbound conveyor.

A put-away task is the storage of a product in a pod. The product must be stored in a temperature appropriate pod. For example, dairy products must be stored at certain temperatures to avoid spoilage. In addition, depending on the type of product, one of the different types of pods will be selected.

The carousels are used to store items in trays. Once the products have been placed in trays, they can either be sent by conveyor for direct put away in the carousels or held on flow racks for later put away. The scheduling of the put away can be based on product shipments, available inventory, load, and other options.

Once the tray is received by conveyor at the carousel pod, audible and/or visual annunciators may indicate the storage location for the tray. The carousel movements are coordinated with the conveyors so that the appropriate storage area of the carousel is available when the tray is to be stored. Weight planning can be used so that heavier trays are stored at or below waist level while lighter trays are stored at or above waist level in the carousel.

FIG. 1 presents a highly simplified depiction of a distribution center 101. In this figure, a tote 103 is introduced into a tote path in the distribution center and moves about on a conveyor 105. It may stop at various pods as it moves throughout distribution center 101. At each pod, a human being, a robot, or a specialized mechanical device picks items from the pod and places them into the tote 103. At the end of the process, tote 103 is filled with items that are used to fill an order. A given order may require one or more totes filled with ordered items. If more than one tote is required because, for example, the customer order does not physically fit into a container, the order is preferably separated in a manner that keeps all items from one pod stop in the same container if possible. This will minimize the total number of stops made by all containers for the order/ambience.

In the example depicted in FIG. 1, there are two types of pods: a mechanical pod 107 and carousels 109, 111, and 113. Various items, each representing a distinct inventory type, are provided in bins or other portions of the pods. Thus, each pod may contain numerous inventory types. Often these inventory types are referred to as SKUs (Stock Keeping Units). In a carousel, items are provided in particular bins, which are rotated into position next to conveyor 105 to facilitate picking. In the example depicted in FIG. 1, carousel 109 has rotated into a temporary position with the items of SKU 02 available for picking. Likewise, carousel 111 has items from SKU 05 available for picking and carousel 113 has items from SKU 01 available for picking. Typically, when tote 103 stops at a conveyor position, it remains at that location until all items available at the proximate pod are picked and put into the tote (assuming that those items are necessary to fill an order associated with tote 103).

As mentioned, each different item of inventory is associated with a respective SKU. For reference, a "product" is a grouping of SKUs. Product information is higher level information that is pertinent to all SKUs in the grouping. It often defines a brand. A "category" is an even higher level classification based on how customers would expect products to be logically grouped. For example, the category "potato chips" may include the products "Brand X" potato chips and "Brand Y" potato chips. Further, the Brand X potato chip products may include a 16-ounce Brand X potato chips item (associated with a first SKU) and a 20-ounce Brand X potato chips item (associated with a second SKU).

While FIG. 1 shows a distribution center having only one area that contains all the pods, a typical distribution center may have multiple zones or ambiences which dictate special storage or handling. For example, a distribution center may have three main temperature zones for products: ambient, refrigerated, and frozen. And within these three zones, there may be specific ambiences for specialty items, e.g., for flowers, cigars, wines, and chocolates. Wines and cigars can be stocked ambiences having specific temperature and humidity controls. Other items may be deemed fragile and therefore stocked or handled separately from other items. Further, a distribution center may have kitchens, bakeries, deli departments, pharmacies, and other facilities to provide certain products.

In one sense, each ambience may be viewed as a separate distribution center within a larger distribution center that has multiple ambiences. To the extent that this discussion refers to a "distribution center" that discussion applies equally to an ambience within a larger distribution center. Thus, each zone or ambience may have its own collection of pods, conveyance mechanisms, computer systems, etc.

From the above discussion, it should be apparent that the stocked inventory has certain relevant attributes. These may be represented in database records or specialized data structures, for example. A warehouse management system or other logic may use such attributes to facilitate control and analysis of the distribution center. Obviously, each SKU will have its own product ID. Another important attribute of inventory units is the "pod" in which an inventory item is located. Another important attribute of specific inventory locations is the expiration date of items that expire (e.g., milk, yogurt, bacon, etc.). The expiration of a given item may be defined very specifically in terms of a particular day or time within a day. As indicated in the discussion of FIG. 1B, it may sometimes be more appropriate to define an expiration interval over a period of multiple days. For items that do not expire (e.g., canned goods, pretzels, etc.), it is less critical to ensure that these items are distributed before a particular expiration date. However, it is still important to make sure that the oldest items are cleared out of the distribution center. Therefore, another attribute of non-expiry items is the date that they were received within the distribution center.

Another important attribute of items within a distribution center is the number of units of such item at any given inventory location within the distribution center. Some items may be stored at more than one inventory location in the distribution center, possibly over multiple pods. These various inventory locations may contain different numbers of units of the same inventory item.

To run a distribution center economically, throughput should be maximized. Generally, maximizing throughput means maximizing the number of picks per unit time. This can be accomplished by tuning at least three parameters: (1) the distribution of loading over the multiple pods of a distribution center, (2) the number of container stops during the course of filling an order, and (3) the location of frequently purchased items.

A well-balanced loading implies that the picks in a distribution center are relatively evenly balanced over its multiple pods. This means that at any given time, all or most of the pods can be engaged in filling orders. As a result, each of the pods can be productively used over most of the course of a day. As described in U.S. patent application Ser. No. 09/568,570, previously incorporated by reference, this state can be approached by intelligently replicating inventory items over multiple pods.

Generally, each additional container stop further lengthens the amount of time required to fill an order. Thus, an order allocation system should allocate order items in a manner that results in the fewest number of pod stops. A general approach to accomplishing this is described below with reference to FIG. 3A.

Items can be stored at various heights in an aisle, a carousel, or other collection of storage locations in a pod. Typically, a human being picks the items from these storage locations. Certain rules can be formulated to protect workers and increase their efficiency. For example, very heavy items should not be stored at higher storage locations. Fast moving items should be stored in a so-called "golden zone." Items in this zone are stored at about chest height to allow rapid picking.

Figure 2:
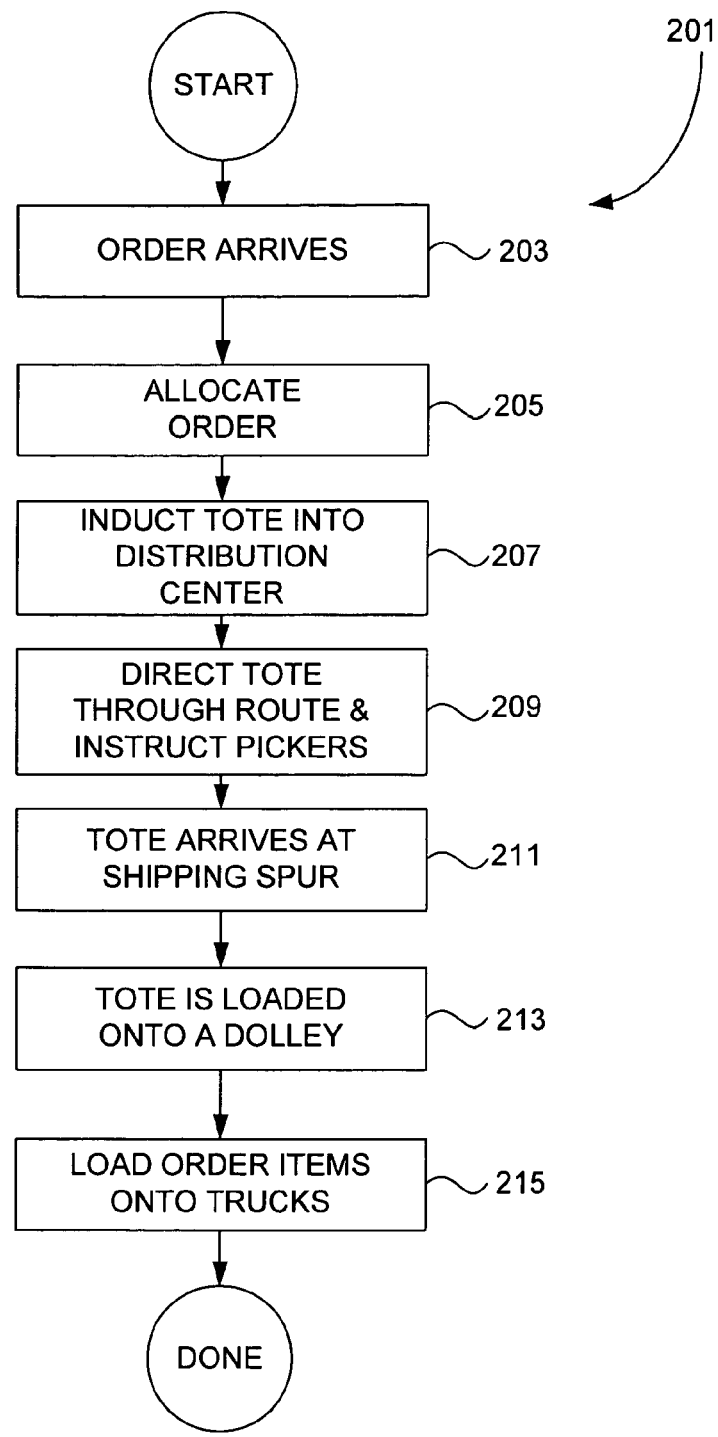
FIG. 2 is a flow chart depicting a high level start-to-finish order fulfillment method that may be used in a distribution center implementing the present invention.

To put the present invention in a larger context, one suitable order fulfillment process flow will now be depicted with reference to FIG. 2. Understand that various order fulfillment process flows may benefit from the technology of this invention. In FIG. 2, an order fulfillment flow 201 is depicted. Typically, this flow will be controlled and implemented by one or more computer systems associated with a distribution center. The process begins at 203 with an order arriving for fulfillment. Such order may arrive via mail, telephone, the Internet, etc. In a preferred embodiment, the order is provided as a computer readable file in a standard format.

Next, at 205, order allocation takes place. This typically involves matching an order with particular inventory stored in a distribution center and determining where that inventory is located. It may also involve marking inventory within the distribution center as "outbound" under the assumption that such inventory will be picked to fill the order. Still further, the allocation process may determine the number of totes needed to fulfill the order and design the path for each tote to follow while the order is being filled. This path will specify various pods at which the tote stops to have particular items picked to fill the order. Certain aspects of the allocation process will be elaborated on below in the discussion of FIGS. 3A-3C.

After allocation, one or more tote is inducted (207) into the system and begins passing through the distribution center according to its pre-specified path. As it travels through the distribution center, it stops at various pods where a computer system presents instructions for pickers to pick selected items for the order. In a preferred embodiment, pickers place specified order items into the tote, and verify the order item fulfillment by scanning each item placed into the tote, as well as the tote's license plate ID, with a handheld computing device (e.g., RF gun). Alternatively, or for certain pod types such as carousels, the worker pushes a button to verify order fulfillment. After the picker has confirmed placement of the specified items into the designated tote, the tote is then reintroduced to the automated tote transport system, where it continues to travel along its designated tote path. Information about the picked items is fed back to a central computer system which tracks order fulfillment and inventory. The tote is routed through various pod locations until the order is completely filled. See 209. The tote path may be dynamically and automatically altered if problems are detected in any portion of the DC operations.

After all items have been picked and confirmed for a particular tote, the tote is routed to a shipping spur at 211. At this point, the tote contains all inventory items that are required to fulfill its portion of the order. A shipping component of the distribution center can now take over processing the order. At 213, workers or mechanical systems place the tote onto a dolly, which may include other totes intended for a specific delivery route. At 215, workers or mechanical systems load the dollies and totes onto trucks destined for specified locations. The trucks deliver orders to the customers who have placed orders. At this point, the order fulfillment process is completed. The distribution computer system may be notified of a shipment confirmation.

After the order has been fulfilled and processed for shipment, the OFS provides post fulfillment status data relating to the customer order. The post fulfillment status data may include, for example, the number of totes and the physical license plate ID of each tote associated with the customer order, the ID of each shipping dolly used to transport the totes to and from the delivery trucks, and/or the vehicle ID associated with the shipped order. The post fulfillment status data may be relayed to a front office that interfaces with customers.

Figure 3A:
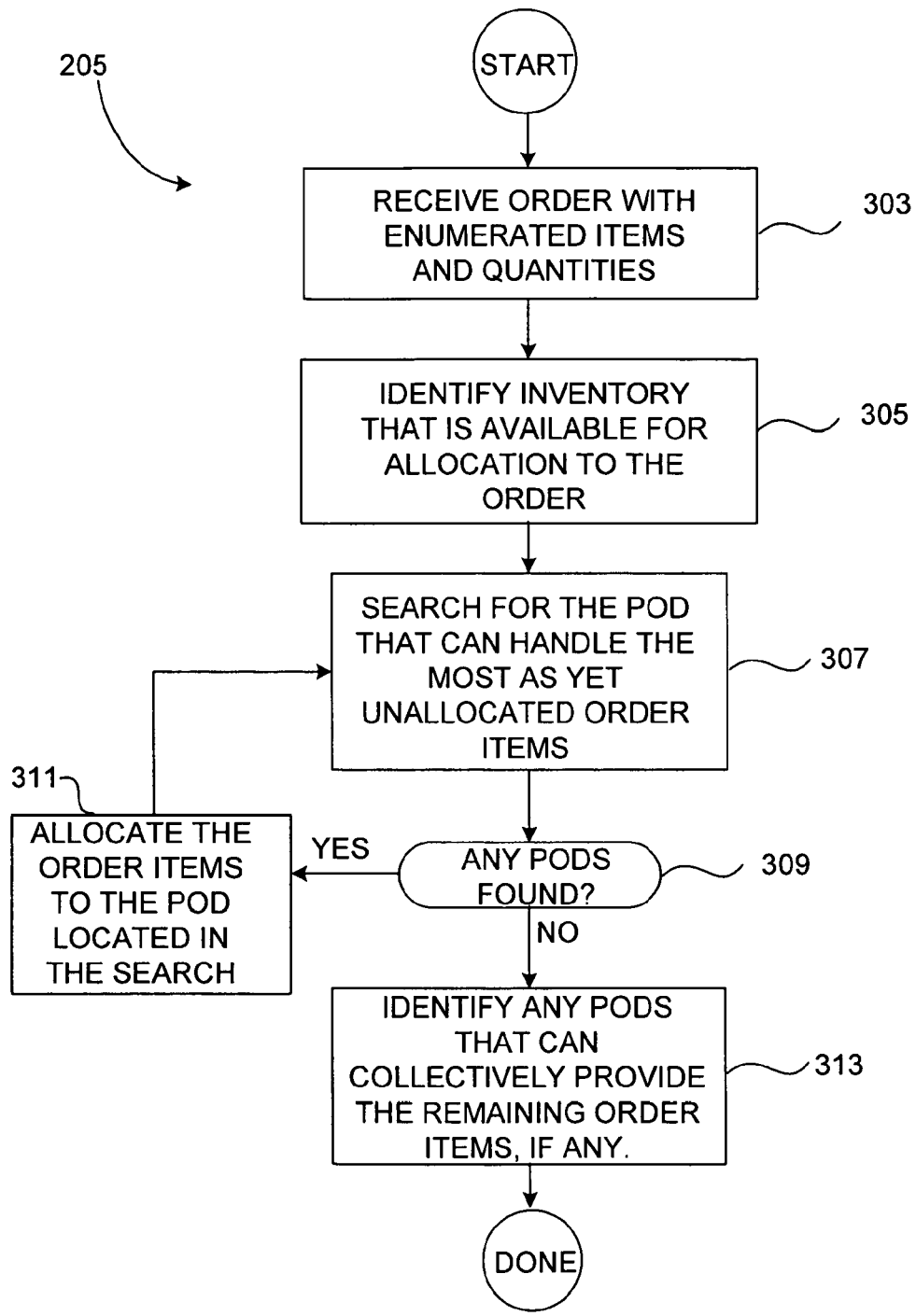
FIG. 3A is a process flow chart depicting a general procedure for allocating customer orders.
Figure 3B:
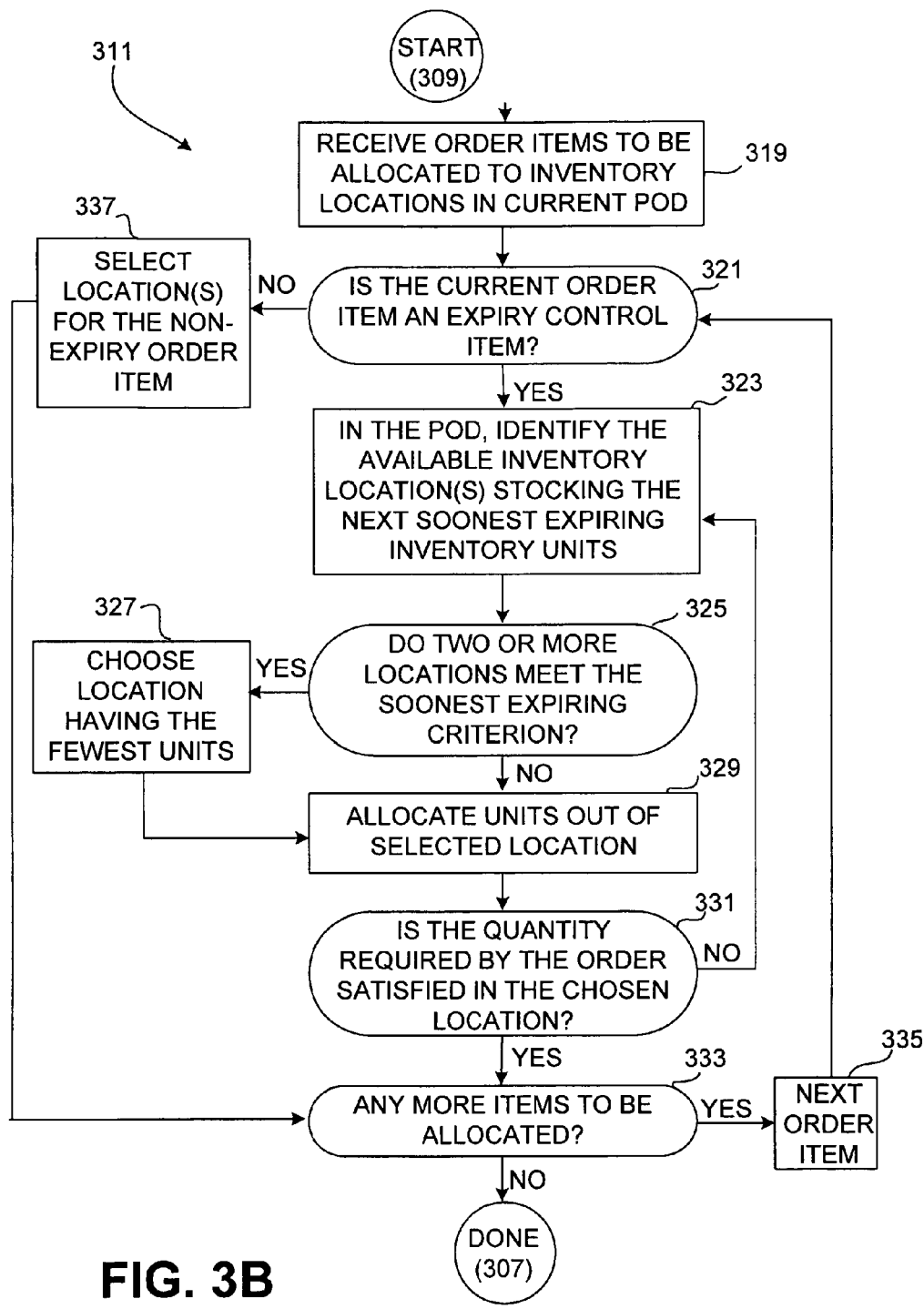
FIG. 3B is a process flow diagram depicting a general procedure for allocating specific order items that are subject to expiration.
Figure 3C:
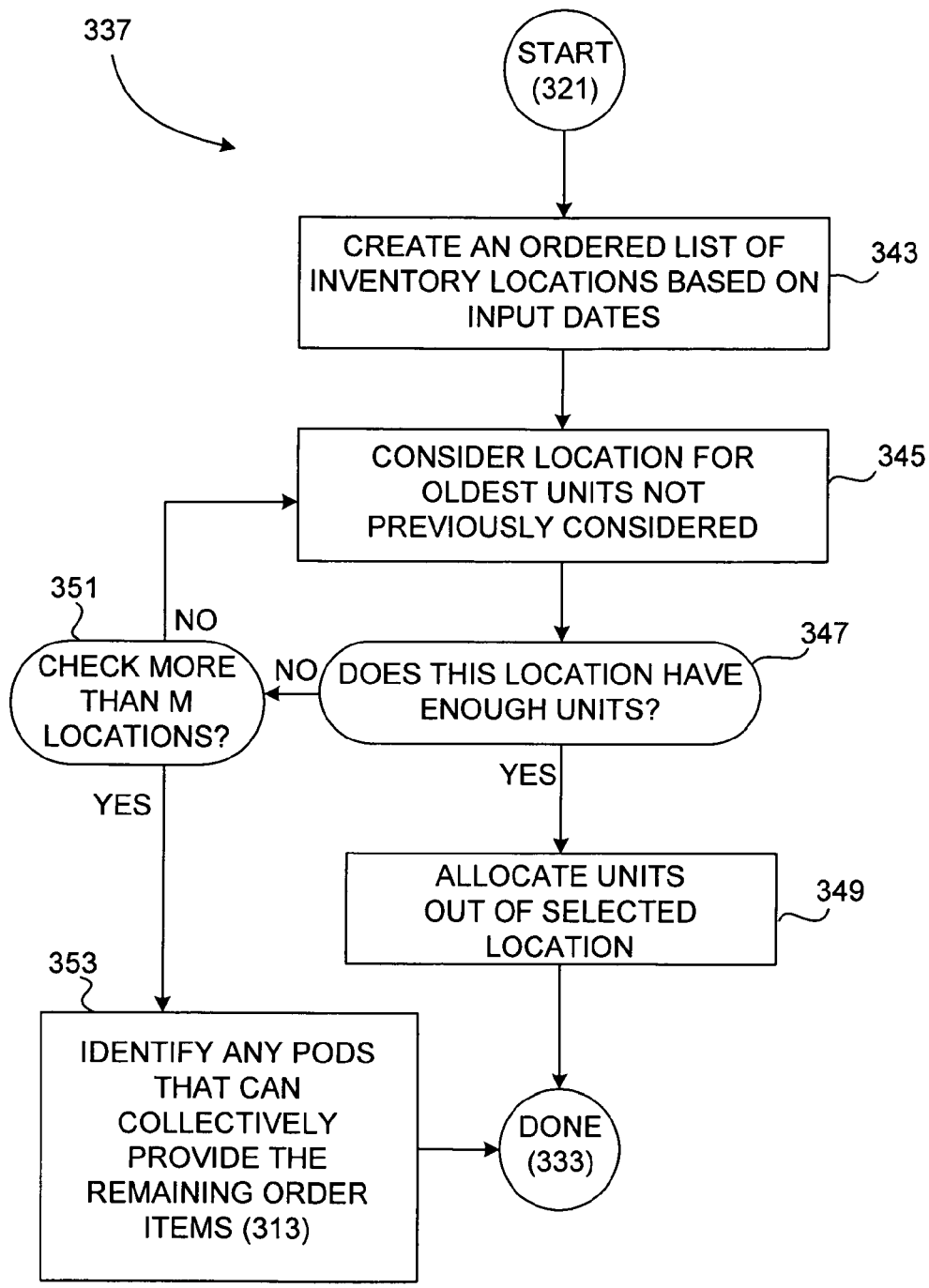
FIG. 3C is a process flow diagram depicting a general procedure for allocating specific order items that are not subject to expiration.

Turning now to FIGS. 3A through 3C, one suitable process for allocating an order in accordance with this invention is depicted. As shown in FIG. 3A, the high level process is depicted by reference number 205, which corresponds to the "allocate order" operation illustrated in FIG. 2.

The order allocation process 205 begins at 303 with the order fulfillment subsystem receiving an order having enumerated items and quantities. Such order may arise in a variety of formats such as a flat file, or a specially formatted data structure. The enumerated items may represent individual SKUs and may be identified by product IDs. The order may also include customer information.

After receipt of the customer order, the order fulfillment subsystem next identifies the inventory within the distribution center that is available for allocation to this particular customer order. See 305. In a preferred embodiment, the distribution center is stocked with inventory that is sometimes replicated. In other words, the inventory is stocked at more than one inventory location within the distribution center. As described in U.S. patent application Ser. No. 09/568,570, replicating inventory in this manner can improve the throughput of the distribution center. In any event, the order fulfillment subsystem preferably identifies all available inventory that can be used to fulfill the order in question.

After such inventory has been identified, the order fulfillment subsystem searches for the particular pod within the distribution center that can handle the most items from the customer order. See 307. Because one of the goals of this invention is to ensure high throughput, the order fulfillment subsystem attempts to design a tote path that requires the fewest number of stops. By identifying a pod that can supply many of the order items, the system begins the process of reducing the number of tote stops.

After the search depicted at 307 concludes, the order fulfillment subsystem determines whether any pods are found that can handle at least one item from the customer order. See 309. Typically this will be the case, at least during the first pass through process 205. It may occur in later passes (note that process 205 includes a loop containing operations 307, 309, and 311) that no pods are found having an inventory location with enough units to fulfill an order line.

In any event, assuming that a pod is found at 309 as a result of the search conducted at 307, the order fulfillment subsystem allocates all the order items to the pod located in the search, so long as those items are actually stocked with the pod. See 311. As described in more detail below with reference to FIG. 3B, this allocation process designates specific inventory from specific locations and generates picking tasks for picking the inventory from such locations.

Now, after the specific items stocked within the pod of interest have been allocated, they no longer need to be considered. The process of allocating the remaining order items is handled by looping back to 307 where the order fulfillment subsystem searches for the pod that can handle the most as yet unallocated order items. In a desired scenario, a second pod within the distribution center will stock a number of the remaining unallocated order items. Assuming this is the case, the system will determine that the appropriate pod was found at 309, on the second pass through the system.

The process continues in this manner, looping through operations 307, 309, and 311, until, hopefully, no further order items remain in the customer order at issue. At that point, no pods will be found at 309 (because there are no additional order lines to process). When this is the case, the order allocation process is effectively completed.

Note, however, that in some cases order items may remain, for which no pods can be found to fully satisfy the order. This may occur when, for example, no single inventory location within the distribution center contains a sufficient quantity of the inventory required to satisfy a particular order line. It may be that a sufficient quantity of such item is available within the distribution center collectively over two or more inventory locations in different pods. To address the situation, the order allocation process 205 identifies any pods that can collectively provide the remaining order items. See 313 on the negative path from decision 309. Units of inventory from these pods then can be allocated to fulfill the customer order.

One example of a specific process for allocating order items to a pod is depicted in FIG. 3B. This general process corresponds to operation 311 depicted in FIG. 3A. The goal here is to reserve specific items of inventory from specific inventory locations within a selected pod.

As shown in FIG. 3B, process 311 begins at 319 with the order fulfillment subsystem receiving order items to be allocated to specific inventory locations in the current pod. Next, the order fulfillment subsystem determines whether the current order item is an expiry control item at 321. As indicated, expiry control items are those which have a defined expiration point, typically defined by an expiration date. Examples include milk and most dairy products, produce, meats, etc.

Assuming that the current order item is an expiry control item, the OFS next identifies an available inventory location within the pod that stocks the earliest expiring inventory units. Thus, for example, a pod having two inventory locations stocking Mother Earth brand non-fat milk in one gallon containers would be analyzed by the OFS to determined which of these locations contains the sooner expiring milk. Intuitively, one would expect that the system would always select the earliest expiring inventory to fulfill a current order. In the process of this invention, as depicted in FIG. 3B, however, additional considerations apply.

For example, it is possible that two or more locations within the pod meet this soonest expiring criterion. The order fulfillment subsystem determines whether this is the case at 325. If so, the order fulfillment subsystem chooses the location having the fewest units. See 327. This is done to quickly clear out stock locations that have only a few units of inventory. As such, this algorithm helps make the most of the distribution center's carrying costs. Note, however, that choosing an inventory location having the fewest units can be counter intuitive. Very often, customer orders require multiple units of a particular item (e.g., two six-packs of Coke). By enforcing this algorithm, sometimes a single location will not supply the entire quantity required by a customer order line.

In any event, after choosing the inventory location at 327, the order fulfillment subsystem next allocates the required order units out of the selected location. See 329. Then the subsystem determines whether the quantity required by the order is satisfied in the chosen location. See 331. If so, process control moves to 333 (described below). If not, the process loops back to 323 where the OFS identifies available inventory locations stocking the "next soonest" expiring inventory units. The process then proceeds to decision 325 as described above (only this time, later expiring inventory units are considered). If two locations contain units meeting the same soonest expiring criteria (e.g., units in both locations expire on the same day), but the chosen location does not have enough units to satisfy the order, then the location having the "next soonest expiring inventor units" identified at 323 is a location having the same expiration window as the previous location. Note that when the OFS determines that only a single location meets the soonest expiring criterion (decision 325 is answered in the negative), process control proceeds directly to allocation operation 329.

After determining that the quantity required by the order is satisfied at 331, the OFS next determines whether any more items remain to be allocated from the current pod. See decision 333. If so, the next order item is considered at 335 and the process loops back to decision 321 where the OFS determines whether this next order item is an expiry control item. When there are no more items to be allocated within the pod under consideration, the process finishes.

Note that when the current order item is not an expiry control item (e.g., decision 321 is answered in the negative), process control moves to 337 where the OFS selects one or more locations for the non-expiry order item. This process is depicted in further detail in FIG. 3C. As shown there, process 337 begins at 343 with the OFS creating an ordered list of inventory locations for the order item under consideration. The ordered list is sorted based on input dates. Thus, for example, a carton of soup arriving at the distribution center in January of a particular year would be sorted above an identical carton of soup arriving at the distribution center in March of the same year.

After creating such ordered list, the OFS next considers the location of the oldest units in the list. See 345. It then determines whether this location has enough units to satisfy the customer order line. See decision 347. If so, it simply allocates the units from the selected location at 349 and the process is then complete for that order item. However, if the location of interest does not have enough units, the OFS may consider the next oldest units in the ordered list. In the algorithm depicted in FIG. 3C, the OFS will do this for a fixed number (M) of times. As illustrated, when decision 347 is answered in the negative, the OFS determines whether it has checked more than M different locations. See decision 351. So long as the OFS has not checked more than M locations in its effort to identify a location having enough units to fulfill the order line, the process loops back to 345. There, the OFS considers the location for the oldest units that were not previously considered.

In order to efficiently allocate orders, the system will not check more than M separate locations. In a specific embodiment, M is configurable, with a default value of 3. After M such checks, decision 351 is answered in the affirmative. At that point, the OFS identifies any pods that can collectively provide the remaining order items. See 353. This operation is analogous to operation 313 described in the context of FIG. 3A. After such pods have been identified, the process is complete.

Figure 4:
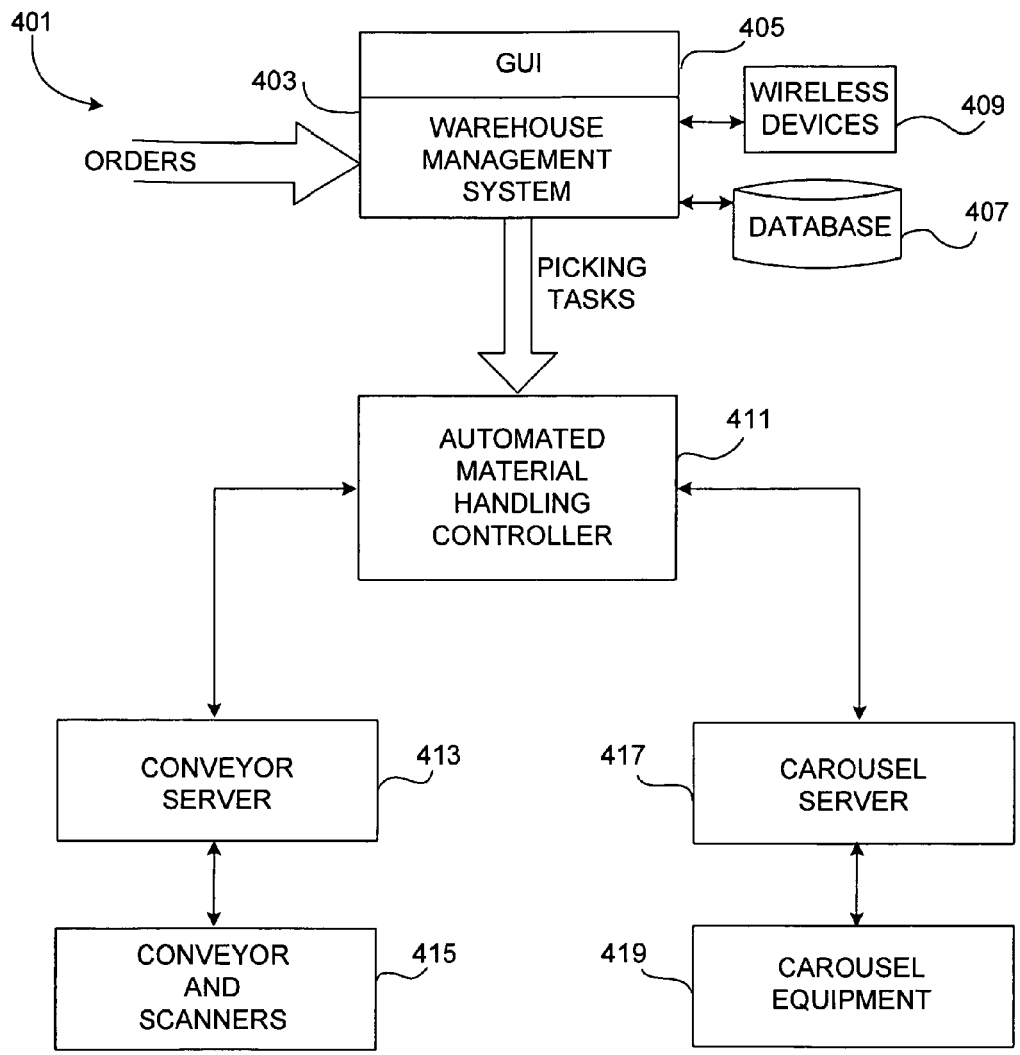
FIG. 4 is a block diagram of an order fulfillment subsystem that may be employed in accordance with an embodiment of this invention.

As indicated, the distribution center, which may include a system of conveyers, carousels, scanners, and hand-held computing units for automating both the order fulfillment (outbound) and inventory restocking (inbound) processes, can be managed by the Order Fulfillment Subsystem. As shown in FIG. 4, an Order Fulfillment Subsystem 401 manages all functionality of the distribution center including a conveyor and associated scanners 415 and pods such as carousels 419. In general, OFS 401 includes appropriate hardware and/or software for managing the distribution facility. Such management hardware and/or software includes, for example, a warehouse management system (e.g. software application) 403 and an automated material handling (AMH) controller component 411, which manages the conveyor, carousel, and scanner components via a conveyor server 413 and a carousel server 417.

In a specific implementation, warehouse management system 403 may be configured with a set of business rules that set forth some or all functions of the present invention. In a very specific example, system 403 is a specially modified and adapted variation of the MOVE warehouse management system provided by Optum, Inc. of Costa Mesa, Calif.

Warehouse management system 403 has at least one database 407 associated therewith and at least a graphical user interface 405. Interface 405 allows certain warehouse personnel to access system 403 and query database 407, for example. It also allows such personnel to monitor distribution center operations and/or manually allocate orders.

Database 407 includes records for all inventory items stocked in the distribution center. In a specific embodiment, the database records may include at least a product ID, an inventory location, a quantity and a state. The state may specify the number of units of the product that are outbound (allocated), inbound (received at the distribution center but not yet putaway to its inventory location) or on hand. On hand items are all items currently physically located in the distribution center, outbound items are on hand items that have been allocated to an order but not yet picked. When an outbound item is picked, the on hand and outbound values for that item are decremented. In a preferred embodiment, database 407 provides inventory information that allows customers to place orders. To determine whether sufficient inventory is present to fill an order line, the system may consider the value of on hand units minus outbound units.

Warehouse management system 403 also communicates with handheld computing devices 409 via a wireless interface such as, for example, a radio frequency (RF) interface. The handheld computing devices 409 are used by the distribution center employees to perform and/or confirm inventory movement operations.

The warehouse system also provides an interface to other distribution system hardware/software, which allows it to receive customer orders for fulfilling. The order data, which is transferred to the OFS subsystem, may include both SKU data (as product IDs), quantities, customer information, and transportation/delivery data (e.g. delivery vehicle routes, stops, etc.). In a specific embodiment, the software interface is implemented using a business host interface (BHI). The interface may also allow other software/hardware components of the distribution center to communicate with the OFS database 407.

The warehouse management system 403 communicates instructions (e.g. task lists) to the automated material handling controller (AMH) 411. Importantly, system 403 outputs picking tasks which specify, for example, an inventory location, a quantity to pick, a container (tote), and an order line for a customer order. The AMH controller 411 processes the instructions and manages the conveyor server 413 and carousel server 417. The carousel server 417 and the conveyor server 413 may each include a respective database. The carousel server 417 issues control signals to the carousel client 419, which drives the carousel hardware and controls the carousel movement. Similarly, the conveyor server 413 processes instructions from the AMH, and issues control signals to the conveyor client 415, which drives and controls the conveyor scanner hardware used for routing inventory and for managing traffic. Additionally, the conveyor client 413 and the carousel client may be configured with an interface for monitoring the status of the conveyor and carousel hardware.

This invention is preferably implemented as software stored or transmitted on a machine-readable medium and executed on a processor. The invention may also be implemented on firmware provided with a processor for executing instructions specified by the firmware. In an alternative embodiment, the invention is implemented on specially designed or configured processing hardware.

Because program instructions and data may be employed to implement the systems/methods described herein, the present invention relates to machine-readable media that include program instructions, velocity data, etc. for performing various operations described herein (e.g., grouping inventory items based on their location on a velocity curve and logically distributing those items in put away regions of a distribution center). Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although certain preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

The invention claimed is:

1. A system, comprising:
   one or more processors configured to:
      receive a customer order including a plurality of items;
      identify, based at least in part on the customer order, a first site from a plurality of sites associated with a distribution center that includes a first number of items from the plurality of items;
      identify, based at least in part on the customer order, a second site from the plurality of sites associated with the distribution center that includes a second number of items from the plurality of items, wherein the second number of items is fewer than the first number of items; and
      determine a route associated with a carrier to fulfill the customer order through the distribution center based at least in part on the first site and the second site; and
   one or more memories coupled to the one or more processors and configured to provide instructions to the one or more processors.

2. The system of claim 1, wherein the first number of items comprises a most number of unallocated items from the plurality of items.

3. The system of claim 2, wherein the second number of items comprises one or more unallocated items from the plurality of items other than those included in the first number of items.

4. The system of claim 1, wherein the one or more processors are further configured to:
   determine that an item included in the first number of items comprises an expiry control item;
   identify one or more inventory locations associated with the first site that include the item; and
   determine an inventory location of the one or more inventory locations that include an earliest expiring inventory unit associated with the item.

5. The system of claim 1, wherein the one or more processors are further configured to:
   determine that an item included in the first number of items comprises an expiry control item;
   identify one or more inventory locations associated with the first site that include the item; and
   determine an inventory location of the one or more inventory locations that includes 1) an earliest expiring inventory unit associated with the item and 2) a least number of inventory units associated with the item.

6. The system of claim 1, wherein the one or more processors are further configured to:
   determine that an item included in the first number of items does not comprise an expiry control item;
   create an ordered list of inventory locations that include the item based at least in part on input dates; and
   determine an inventory location associated with an oldest input date.

7. The system of claim 1, further comprising a database that is configured to store allocation states associated with items associated with the distribution center.

8. The system of claim 1, wherein the first site is associated with a first ambient and the second site is associated with a second ambient.

9. The system of claim 1, wherein the carrier is associated with an identification that is configured to be scanned in response to receipt of an item from the first site or the second site.

10. The system of claim 1, wherein the one or more processors are further configured to cause a transport system to transport the carrier along the route.

11. The system of claim 1, wherein the one or more processors are further configured to modify allocation states associated with the first number of items to indicate that the first number of items is associated with the customer order.

12. The system of claim 1, wherein the one or more processors are further configured to modify allocation states associated with the second number of items to indicate that the second number of items is associated with the customer order.

13. A method, comprising:
   receiving a customer order including a plurality of items;
   identifying, using one or more processors, based at least in part on the customer order, a first site from a plurality of sites associated with a distribution center that includes a first number of items from the plurality of items;
   identifying, based at least in part on the customer order, a second site from the plurality of sites associated with the distribution center that includes a second number of items from the plurality of items, wherein the second number of items is fewer than the first number of items; and
   determining a route associated with a carrier to fulfill the customer order through the distribution center based at least in part on the first site and the second site.

14. The method of claim 13, wherein the first number of items comprises a most number of unallocated items from the plurality of items.

15. The method of claim 14, wherein the second number of items comprises one or more unallocated items from the plurality of items other than those included in the first number of items.

16. The method of claim 13, further comprising:
   determining that an item included in the first number of items comprises an expiry control item;
   identifying one or more inventory locations associated with the first site that include the item; and
   determining an inventory location of the one or more inventory locations that includes an earliest expiring inventory unit associated with the item.

17. The method of claim 13, further comprising:
   determining that an item included in the first number of items comprises an expiry control item;
   identifying one or more inventory locations associated with the first site that include the item; and
   determining an inventory location of the one or more inventory locations that includes 1) an earliest expiring inventory unit associated with the item and 2) a least number of inventory units associated with the item.

18. The method of claim 13, further comprising:
   determining that an item included in the first number of items does not comprise an expiry control item;

creating an ordered list of inventory locations that includes the item based at least in part on input dates; and determining an inventory location associated with an oldest input date.

19. The method of claim 13, further comprising causing a transport system to transport the carrier along the route.

20. A computer program product, the computer program product being embodied in a non-transitory computer readable storage medium and comprising instructions for:

receiving a customer order including a plurality of items;

identifying, based at least in part on the customer order, a first site from a plurality of sites associated with a distribution center that includes a first number of items from the plurality of items;

identifying, based at least in part on the customer order, a second site from the plurality of sites associated with the distribution center that includes a second number of items from the plurality of items, wherein the second number of items is fewer than the first number of items; and determining a route associated with a carrier to fulfill the customer order through the distribution center based at least in part on the first site and the second site.

* * * * *